United States Patent [19]

Shinmura et al.

[11] Patent Number: 5,193,171
[45] Date of Patent: Mar. 9, 1993

[54] METHOD OF MANAGING SPACE OF PERIPHERAL STORAGES AND APPARATUS FOR THE SAME

[75] Inventors: Yoshiaki Shinmura, Chigasaki; Kazuo Imai, Higashikurume, both of Japan

[73] Assignee: Hitachi, Ltd., Tokyo, Japan

[21] Appl. No.: 625,046

[22] Filed: Dec. 10, 1990

[30] Foreign Application Priority Data

Dec. 11, 1989 [JP] Japan ................................. 1-320933

[51] Int. Cl.⁵ .......................................... G06F 13/00
[52] U.S. Cl. ............................... 395/425; 364/DIG. 1; 364/243.2; 364/245.3; 364/245.8; 364/DIG. 2; 364/964.3; 364/967.4; 395/600
[58] Field of Search ............ 364/200, 900, 243.2, 364/964.3, 964.6, 967.4; 395/425, 600

[56] References Cited

U.S. PATENT DOCUMENTS

| | | | |
|---|---|---|---|
| 4,104,718 | 8/1978 | Poublan et al. | 364/200 |
| 4,403,283 | 9/1983 | Myntti et al. | 364/200 |
| 4,467,421 | 8/1984 | White | 364/200 |
| 4,685,057 | 8/1987 | Lamone et al. | 364/200 |
| 4,758,944 | 7/1988 | Bartley et al. | 364/200 |
| 4,775,932 | 10/1988 | Oxley et al. | 364/200 |
| 5,001,653 | 3/1991 | Buchanan et al. | 364/200 |
| 5,062,055 | 10/1991 | Chinnaswamy et al. | 364/200 |

Primary Examiner—Dale M. Shaw
Assistant Examiner—Robert S. Hauser
Attorney, Agent, or Firm—Antonelli, Terry, Stout & Kraus

[57] ABSTRACT

A data processing system for allocating a plurality of peripheral storages to a plurality of users comprises a data processing device, a plurality of peripheral storages connected with the data processing device, a catalog control unit for setting on a table a total usage capacity of the usable space set by users including an active pool having a plurality of peripheral storages to which files are allocated and an inactive pool for holding files which are migrated from the active pool, a file allocating unit which sets the current usage capacity on a table depending upon the use of space of said active pool to compare the sum of the added space capacity inputted by users and the current usage capacity with said total usage capacity for deciding an error of allocation of the added peripheral storage when the sum is larger than the latter. A part of the peripheral storage in the active pool is set as spare volumes and the spare volumes are temporarily allocated when a failure occurs in the remaining part of the peripheral storages in the active pool or when there is not enough free space in the active pool.

18 Claims, 6 Drawing Sheets

POOL MANAGEMENT TABLE 12

POOL B : ATTRIBUTE (INACTIVE) — 12b

POOL A : ATTRIBUTE (ACTIVE) — 12a

| VOLUME NAME | VOLUME ATTRIBUTE | CAPACITY | USAGE CAPACITY | STATE |
|---|---|---|---|---|
| VOLUME A | | | | |
| ⋮ | | | | |
| VOLUME X | SPARE | | | |
| ⋮ | | | | |

FIG. 2B

SPACE MANAGEMENT TABLE — 13

| USERS (13a) | ACTIVE POOL NAME (13b) | INACTIVE POOL NAME (13c) | MAXIMUM USABLE CAPACITY (13d) | | | ACTUAL USED CAPACITY (13h) | |
|---|---|---|---|---|---|---|---|
| | | | TOTAL USABLE CAPACITY (13e) | ACTIVE RESERVED CAPACITY (13f) | ACTIVE ASSURED CAPACITY (13g) | ACTIVE USED CAPACITY (13i) | TOTAL USED CAPACITY (13j) |
| ⋮ | ⋮ | ⋮ | ⋮ | ⋮ | ⋮ | ⋮ | ⋮ |

FIG. 3

NEW FILE ALLOCATED TO ACTIVE POOL

FIG. 5A

FILE SPECIFIED TO MIGRATE BY JOB CONTROL STATEMENT

```
//...    DD    DSN= FILE NAME
//             DISP=(NEW, ARCIV)
```
─51

FIG. 5B

CALL MIGRATION/ARCHIVE/RECALL PROCESSING ON RELEASING FILE ALLOCATION

FIG. 6
STATE TRANSITION OF SPARE VOLUME

METHOD OF MANAGING SPACE OF PERIPHERAL STORAGES AND APPARATUS FOR THE SAME

BACKGROUND OF THE INVENTION

The present invention relates to a management of space in a peripheral storage group for a data processing system having a data processing device and a plurality of peripheral storages and in particular to a space management method which is preferred for efficient utilization of space in a peripheral storage group by a plurality of users.

A prior art data processing system for allocating space to users for each volume on the basis of a maximum capacity of usage of space and the number of files which can be assigned to each user who is preliminarily registered in a space control table for efficiently using space in the peripheral storage is described in, for example, Japanese Unexamined Patent Publication Sho/60-89258. The term "file" refers to one or a plurality of areas which are physically continuous and in which data can be stored in a volume. In the prior art, the volumes are prevented from being occupied by less users by setting a space usage capacity for each user and by saving excess files to save volumes. However, since the physical total capacity of the volumes is limited, if the total usage capacity of the space used by users exceeds the total capacity of the volumes, migration, that is, data movement between primary and secondary storages will readily occur, resulting in low performance. Accordingly, there are problems that it is necessary to suppress the total usage capacity of space used by users within the total capacity of the volumes and that it is necessary to readjust the usage capacity of space for each user depending upon changes in users which use the volumes. There is also a problem that it is necessary to preset a maximum capacity of a newly added volume to the users if a new volume is added since a maximum usage capacity of space is set in units of a volume.

The above mentioned prior art has a problem that even a file having a very low usage frequency is left in the volume if the usage capacity is within the maximum usage capacity of space although files are saved by maximum usage capacity management of space for each user.

SUMMARY OF THE INVENTION

It is an object of the present invention to relax the restriction that the total usage capacity of space by a user using a volume is suppressed within a physical total capacity of volume and to achieve management of a maximum capacity of space in total as a volume group.

It is another object of the present invention to provide a storage management method and system for the same in which it is not necessary to reset the registered space usage capacity depending upon a change in the number of users and the capacity of space used by the users.

It is a further object of the present invention to realize a storage management method which makes it possible to add volumes to an active pool without resetting a space usage capacity with respect to frequent data file movements between the active pool and an inactive pool.

It is a further object of the present invention to increase the total capacity of space of an active pool which can be used by a user only by addition of volumes without resetting the maximum capacity.

It is a further object of the present invention to provide control in such a manner that files having less frequency of usage are not actively left in volumes by automatically saving files which have been found to be very low in frequency of usage for efficiently utilizing the space of the volumes.

It is a further object of the present invention to provide a storage management method and a system for the same which can assure enough space by the movement of a file to spare volumes when the movement of a file from an active pool to an inactive pool cannot assure enough space.

In order to accomplish the above objects, a peripheral storage group is divided into an active pool for file allocation and a inactive pool for file migration as a storage pool. A total usage capacity including the active and inactive pools is preliminarily set as a maximum usage capacity of space. Files are allocated on the basis of the total usage capacity. The usage capacity of the active pool is set as a maximum usage capacity of space in addition to the total usage capacity including both active and inactive pools. Files are moved between the active and inactive pools on the basis of the usage capacity of space of the active pool.

With respect to a particular file, location of the file and the destination of the file on completion of processing is specified in response to the request, for use in the file.

Spare volumes are disposed in the active pool. Spare volumes in the active pool are temporarily allocated when free space capacity in the active pool is insufficient or when enough free space capacity cannot be assured by the movement of files to the inactive pool. The spare volumes are used as an alternative volume for an active volume when a failure occurs in the volume in the active pool.

The present invention provides space which exceeds the total space capacity of an active pool by grouping a peripheral storage group into an active pool for file allocation and an inactive pool for file migration, by linking the active pool with the inactive pool to function as a large capacity logical volume and by specifying the space usage capacity including the active and inactive pools.

On allocation of space by users, the space usage capacity for each user is measured. If the measured space usage capacity is within the total usage capacity, space allocation is carried out. If effective free space is not in the active pool on allocation of space, free space is assured by moving an unused file for exclusive users to a migration pool. If enough free space cannot be assured only by the file movement for exclusive users to a migration pool, assurance of free space is achieved by migrating an unused file for other users. This enables users to use space which exceeds the total space capacity of the active pool and to make unnecessary a change in space usage capacity even if users who use pools change.

When there is not enough space in the active pool on file allocation according to the usage capacity of space which is available in the active pool, the assured capacity for assuring space in the active pool and the total usable capacity including the inactive pool provides a maximum usage capacity of space relative to the above mentioned storage pool. An unused file for exclusive users is preferentially migrated if the amount of currently used space in the active pool is larger than the usage capacity of the active pool. Unused files for exclusive users are migrated to the inactive pool also when the amount of currently used space in the active pool exceeds the assured capacity of the active pool. This makes it possible to efficiently achieve the migration of unused files for exclusive users to the inactive pool without affecting other users.

Location of a file and the destination of the file on completion of processing is specified on request of file use. If the file is in the inactive pool when file allocation is specified, the file is moved from the inactive pool to the active pool prior to file access. This makes it possible to achieve the movement of a file from the inactive pool to the active pool prior to file access so that lowering of throughput can be prevented. If movement of the file to the inactive pool on completion of file processing is specified, the file is moved from the active pool to the inactive pool on releasing of the file allocation. This actively makes the space in the active pool free so that the need for movement of a file from the active pool to the inactive pool can be reduced.

The problem of insufficiency of capacity of the storage pool can be overcome by disposing spare volumes in the active pool and by temporarily allocating spare volumes in the active pool when free space capacity in the active pool is insufficient or when efficient space cannot be assured even by the migration of an unused file. The file which has been allocated to the spare volumes in the storage pool is migrated to the inactive pool for migration on completion of access. This causes the space in the spare volumes to assure initial value so at which the frequency that the space of the spare volume is found to be insufficient is reduced.

If a failure occurs in the volume in the active pool, the total space capacity in the active pool can be assured by allocating spare volumes an alternative volume. In this case, file allocation to the spare volume which has been the alternative volume is prohibited at a moment when the affected volume is returned to the active pool. A file existing in the alternative volume is moved to the other volume in the active pool or to a migration pool after the completion of access since the alternative volume can be returned as a spare volume at the time when all files in the alternative volume can be moved by the above mentioned file movement, and so the spare volumes in the active pool can be effectively used.

Disposing a plurality of spare volumes in the active pool can flexibly cope with insufficiency of allocated space and volume fault.

DESCRIPTION OF PREFERRED EMBODIMENTS

A preferred embodiment of the present invention will be described with reference to the drawings.

Figure 1:
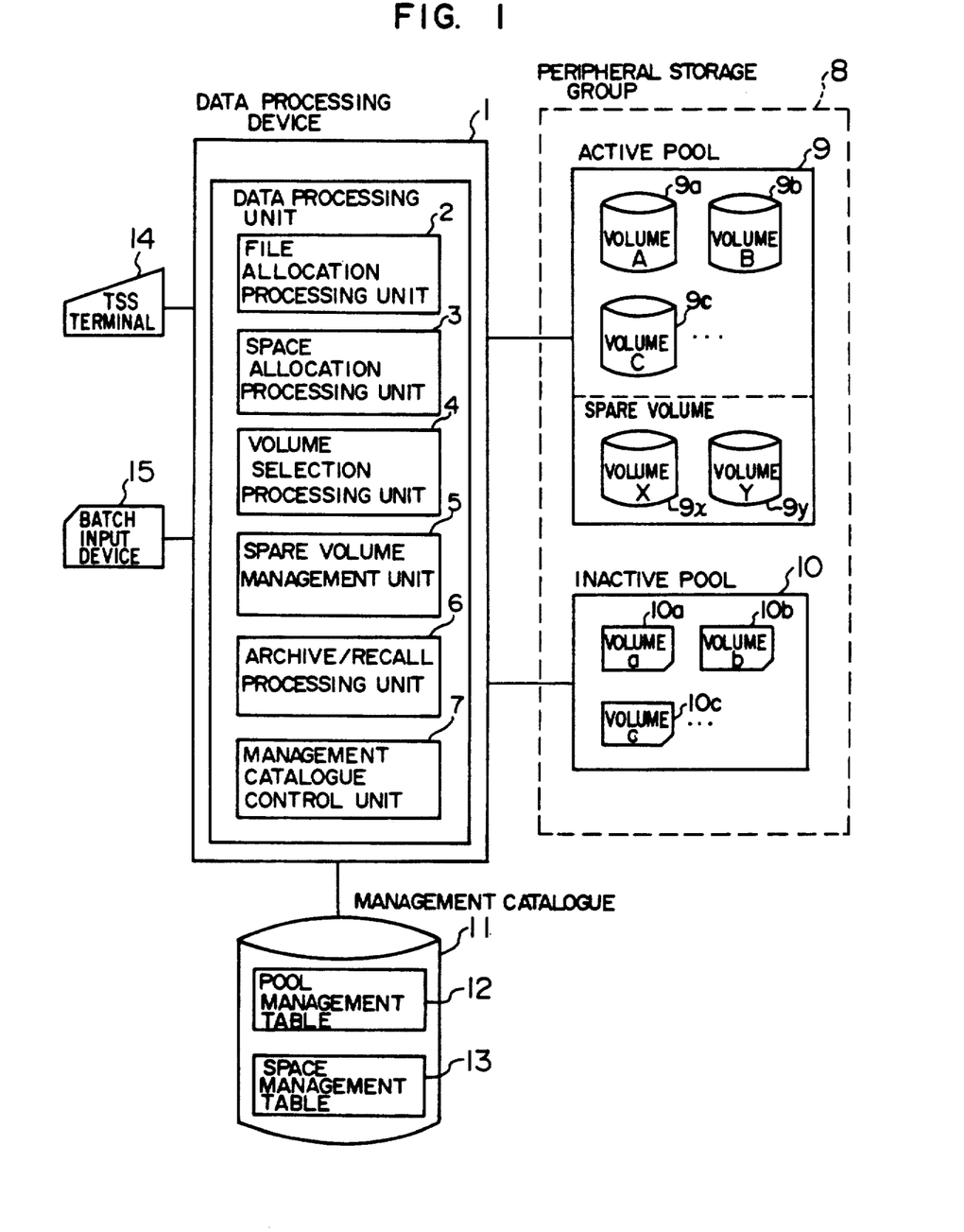
FIG. 1 is a block diagram showing the architecture of a system according to one embodiment of the present invention.

The system architecture of one embodiment of the present invention is shown in FIG. 1. A data processing device 1 is connected with a peripheral storage group 8 including a multiplicity of storage volumes. The peripheral storage group 8 is grouped into a plurality of storage pools depending upon their performances and utilization objects. Volumes A9a, B9b, C9c, ... are grouped into an active pool 9 for file allocation. Volumes a10a, b10b, c10c, ... are grouped into an inactive pool 10 to form an archival file. Spare volumes X9x, Y9y are provided in the active pool 9 and may be used as spare volumes when space in the active pool 9 is insufficient and as alternative volumes when a failure occurs. A management catalog 11 stores a pool management table 12 and a space management table 13 for managing the state of the active and inactive pools 9 and 10. Jobs are inputted from an TSS terminal device 14 and a batch input device 15.

The data processing device 1 comprises a data processing unit, memory unit (not shown), etc. The data processing unit functionally has a file allocation processing unit 2 for allocating files, a space allocation processing unit 3 for allocating the space in the active pool 9, a volume selection processing unit 4 for selecting volumes in the active and inactive pools 9 and 10, a spare volume management unit 5 for managing the spare volumes provided in the active pool 9, an archive/recall processing unit 6 for performing migration or archive operation which involves a file movement from the active pool 9 to the active pool 10 and a recall which is a file movement from the inactive pool 10 to the inactive pool 9, and a management CATALOG control unit 7 for managing the management catalog 11.

Figure 2A:
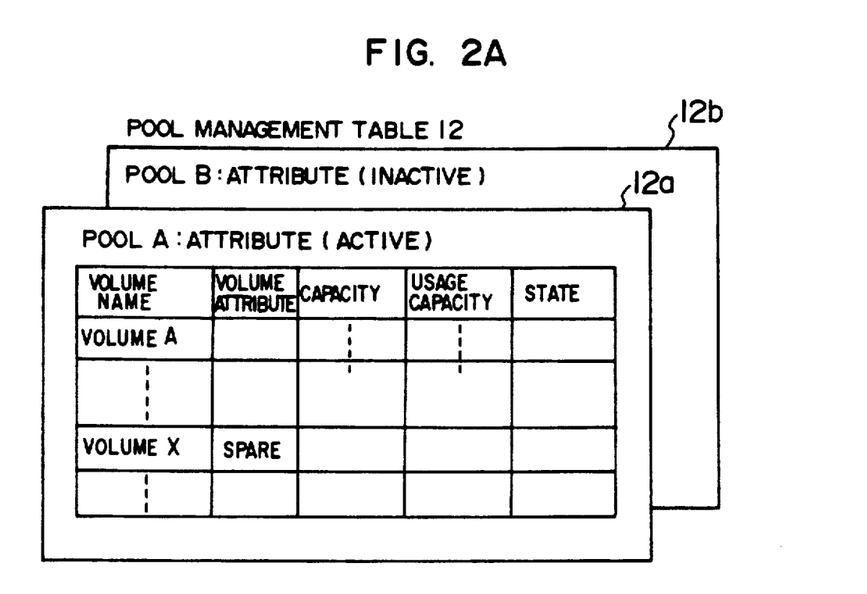
FIGS. 2A and 2B are views showing the contents of management catalog stored in a management file of FIG. 1.
Figure 2B:
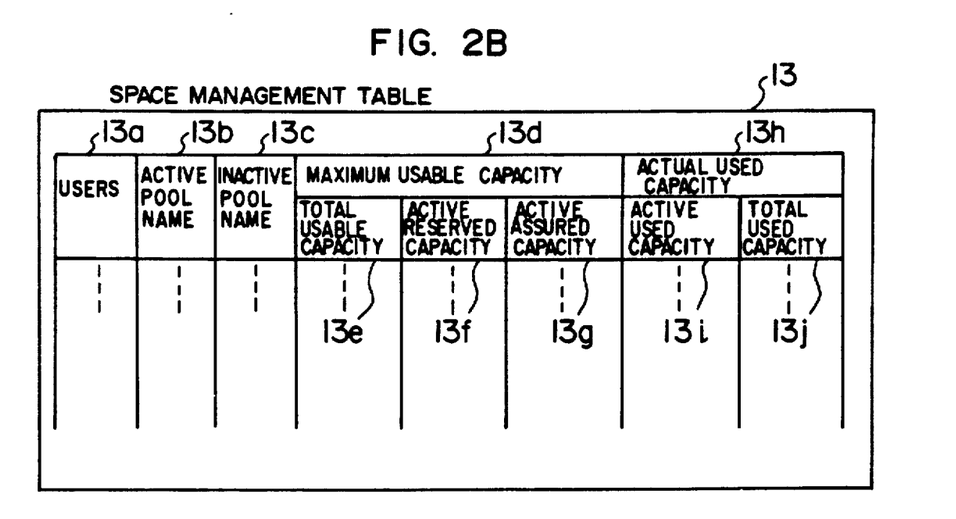

The details of the pool management table 12 and the space management table 13 are shown in FIGS. 2A and 2B.

The pool management table 12 comprises an active pool management table (A)12a for managing the active pool 9 and an inactive pool management table (B)12b for managing the inactive pool 10. The pool management table 12 is prepared by preliminarily grouping the peripheral storage group 8 into the active pool 9 for file allocation and the inactive pool 10 for forming an archival file depending upon their performances and application objects. Each of the tables 12a, 12b is defined by pool attribute (active or inactive), the name of the volume contained in the pool, the volume attribute (for example, spare volume attribute), the space capacity in each volume, the amount of used space and, the volume state (for example, volume which is rendered inactive corresponding to failure, that is, failure blocked volume state). These tables are used for allocating space to the volume selecting processing unit 4 and the spare volume management unit 5.

The space management table 13 is adapted to manage a maximum capacity of usable space and an actual capacity of used space, etc including the active and inactive pools 9 and 10 for each user which uses the active pool 9. The space management table 13 is a management table which functions as a center of the space management of the present invention. The space management table 13 has a name of a user 13a, a name of the active pool to be used 13b, a name of the inactive pool to be used 13c, a total capacity of usable space 13e representing the maximum capacity of the active and inactive pools 9 and 10, an active assured capacity 13g which is a limit assumed as a minimum space existing within the active pool 9, an active reserved capacity 13f which is reserved capacity which is reserved as a space capacity by a user and will be a limit for moving a file having a capacity slightly less than the excess space when the space to be used in the active pool 9 exceeds the active reserved capacity 13f on request of a migration/archive operation from any other user, a currently used space capacity 13i of the active pool 9 as a currently used space size and a currently used total capacity 13j of space including the active and inactive pools 9 and 10 for each user. The active reserved capacity 13f is not less than the active assured capacity 13g. A user who uses the active and inactive pools 9 and 10 preliminarily sets the active pool name 13b, the inactive pool name 13c and the maximum usable capacity 13d of usage of space in the space management table 13 and stores this data into the management catalog 11 using the management CATALOG control unit 7 and thereafter carries out file allocation. The currently used space capacity 13h is automatically measured by means of the space allocation processing unit 3 and the archive/recall processing unit 6 and is updated by means of the management CATALOG control unit 7. The unit of the maximum capacity of usable space is that for a user in the present embodiment. If the unit is set as a group comprising a plurality of users and a group in an operation unit and the like depending upon the system, an elaborate space management can be realized.

Operation of the present embodiment will be described with reference to FIGS. 3 to 6.

Figure 3:
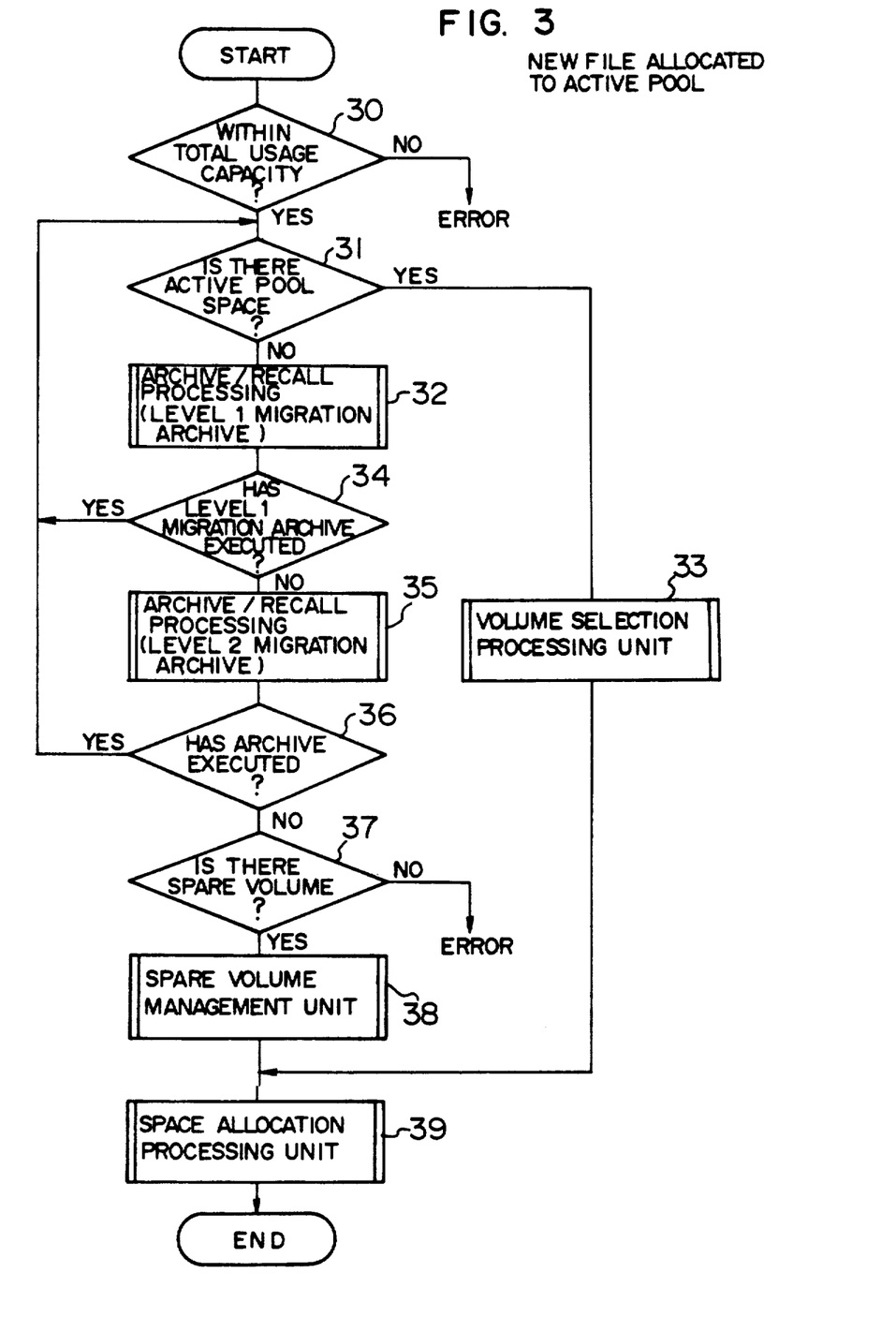
FIG. 3 is a flow chart showing new file allocation.

FIG. 3 is a flow chart showing allocation of a new file to the active pool 9. When the file allocation processing unit 2 allocates space to the active pool 9 according to a request inputted from a user by a batch input device/TSS terminal device, and when an entry corresponding to the user in the space management table 13 is preliminarily inputted into memory via the management catalog control unit 7 and a value of the sum of the currently used capacity 13i and the capacity of space to be newly allocated already exceeds the total usable capacity 13e (decision 30), an allocation error is detected. If it is less than the total usable capacity 13e (decision 30), it is checked whether or not there is enough free space in the active pool 9. If there is enough free space (decision 31), the volume selection processing unit 4 is called to indicate an object volume to be allocated depending upon the size of free space (step 33) for executing a step 39. If there is insufficient free space (decision 31), an archive/recall processing routine is called for performing a migration or archive operation which is specified as level 1 (the details will be described with reference to FIG. 4) (step 32). If the migration operation has been executed (decision 34), the decision 31 is performed again. If the migration operation has not been executed (decision 34), the archive/recall processing is called for executing a migration operation specified as level 2 (the details will be described with reference to FIG. 4) (step 35). If the migration operation has been executed (step 36), the decision 31 is executed again. If the migration/archive operation has not been executed (decision 36), whether or not a spare volume X(9x) or Y(9y) exists in the active pool 9 is checked (decision 37). If none of spare volumes 9X, 9Y exists, the allocation is determined to be an error. If there are spare volumes 9X, 9Y, the spare volume management unit 5 is called to decide an object spare volume (step 38) for executing step 39. At step 39, the space allocation processing unit 3 is called to complete space allocation.

Figure 4:
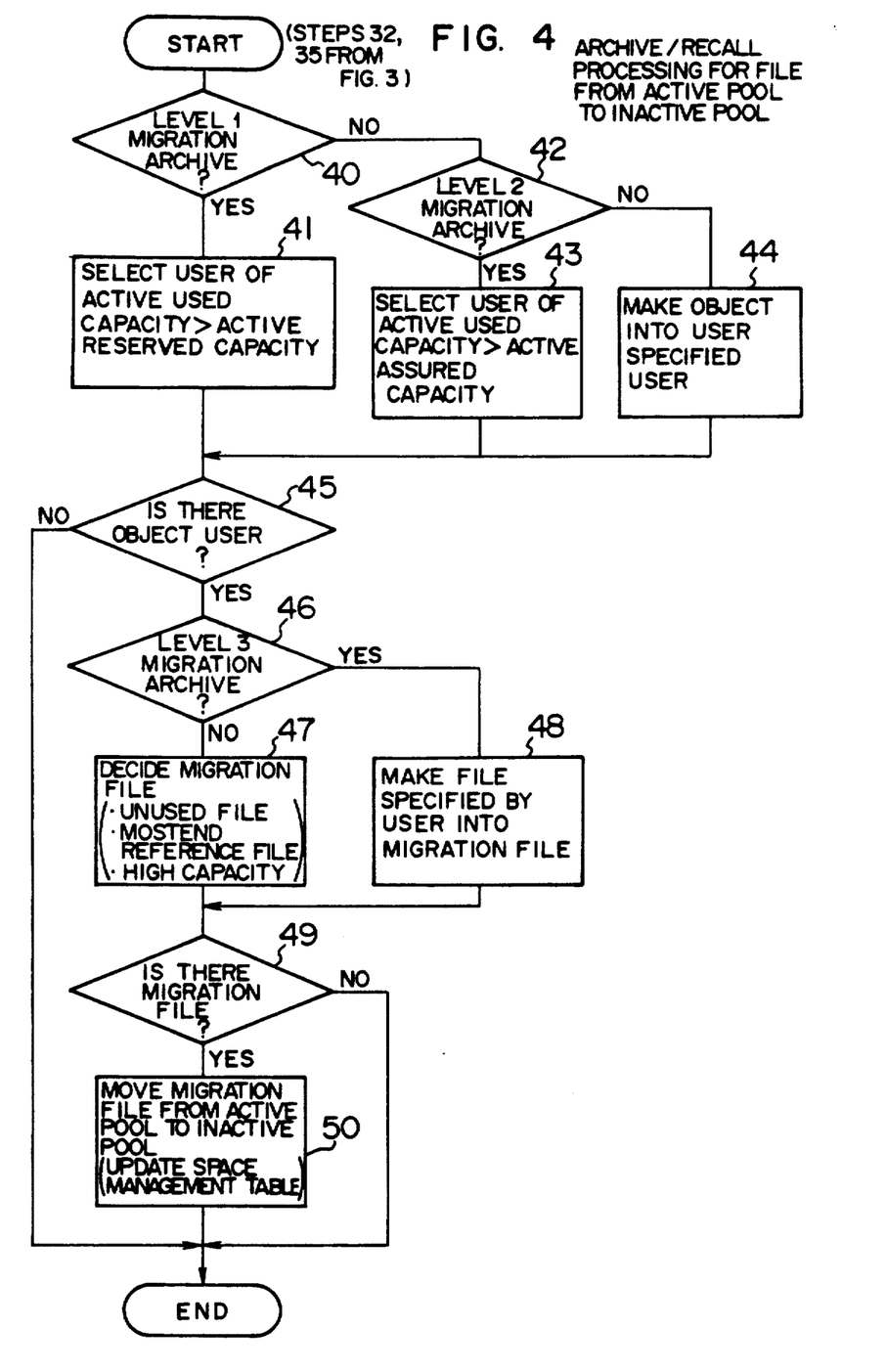
FIG. 4 is a flow chart showing file movement from an active pool to an inactive pool.

FIG. 4 is a flow chart showing a processing for migrating a file from the active pool 9 to the inactive pool 10. The file is one or a plurality of areas on which data can be placed in a volume. A request for migration of a file is herein assumed as level 1 to level 3. The number of levels is not particularly limited. It is possible to make the number of levels not less than 4. For convenience of description, the level is up to level 3. Firstly, whether the request is a level 1 migration archive is checked. If the request is a level 1 migration archive (decision 40), a step 41 is executed. If the request is not level 1 migration archive (decision 40), whether the request is a level 2 archive is checked. If the request is a level 2 archive (decision 42), a step 43 is executed. If the request is not a level 2 migration archive (decision 42), the object user is made a specified user (step 44). The step 43 is for the level 2 migration archive in which the space management table 13 is used for a user having the active used capacity 13i exceeding an active assured capacity 13g as an object user to execute a decision 45. The step 41 is for the level 1 migration archive in which the space management table 13 is used for a user having the active used capacity 13i exceeding the active reserved capacity 13f as the object user to execute decision 45. At the decision 45, whether or not there is a migration archive object user is checked. If there is no such user, the migration archive processing is not performed. If there is an archive object user, whether or not the request is a level 3 migration archive is checked. If the request is a level 3 migration archive (decision 46), the file specified by the user is decided as a migration file (step 48) to execute a decision 49. If it is not a level 3 migration archive (decision 46), a file which has not been used as a migration file of an object user, that is, which has not been declared to be used, and is the oldest referenced file or has a large space capacity is selected with reference to a table having presence of a data set, file size and data of access in a volume to execute a decision 49. Whether or not there is a file to be migrated is checked at a decision 49. If there is such a file, the file is then migrated from the active file 9 to the inactive pool 10 (step 50). The management catalog control unit 7 is called to update the space management table 13 to complete migration/archive processing.

Figure 5A:
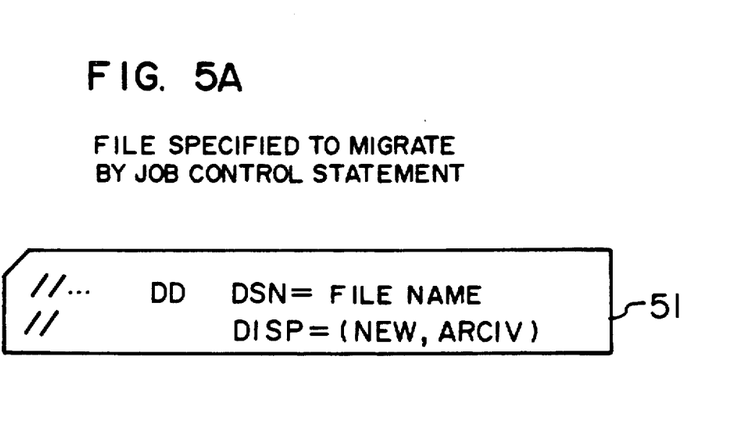
FIGS. 5A and 5B are views showing a specification of file migration on releasing file allocation and a flow of processing.
Figure 5B:
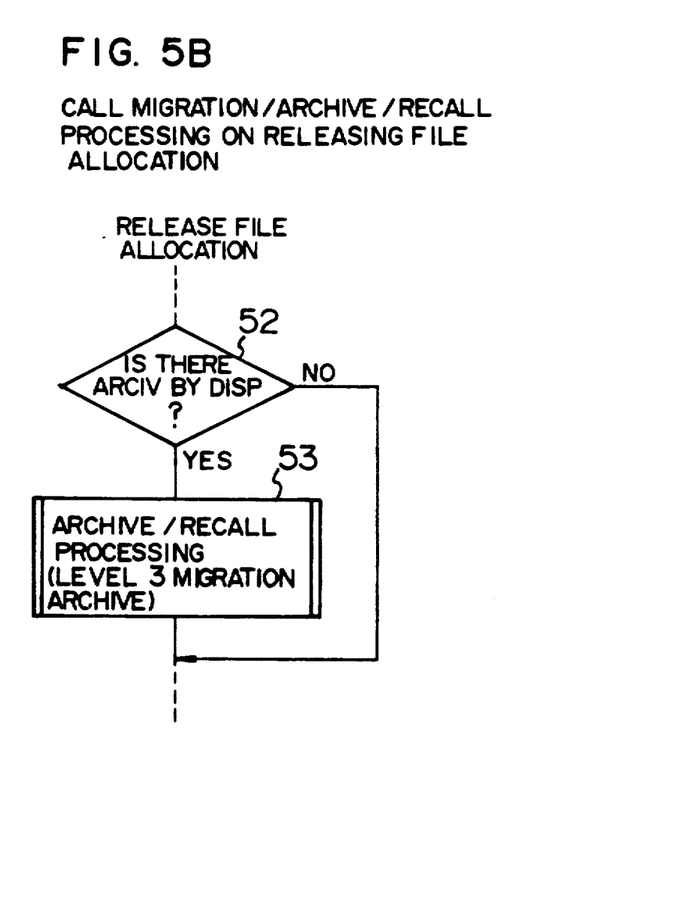

FIGS. 5A and 5B are views showing file migration specification and file migration flow on releasing file allocation, respectively. When ARCIV is specified with DISP operand of DD statement 51 defining a file, whether or not ARCIV (archive) is specified with DISP operand of data set definition (DD) statement 51 on releasing file allocation is checked by the file allocation processing unit 2 as shown in FIG. 5B (decision 52). If there is a specification of ARCIV, file migration is carried out by calling archive/recall processing unit 6 by level 3 archive specification (step 53). File recall (movement of file from the inactive pool 10 to the active pool 9) can be readily realized by specifying RECALL (recall) in a DISP operand in the DD statement 51.

Figure 6:
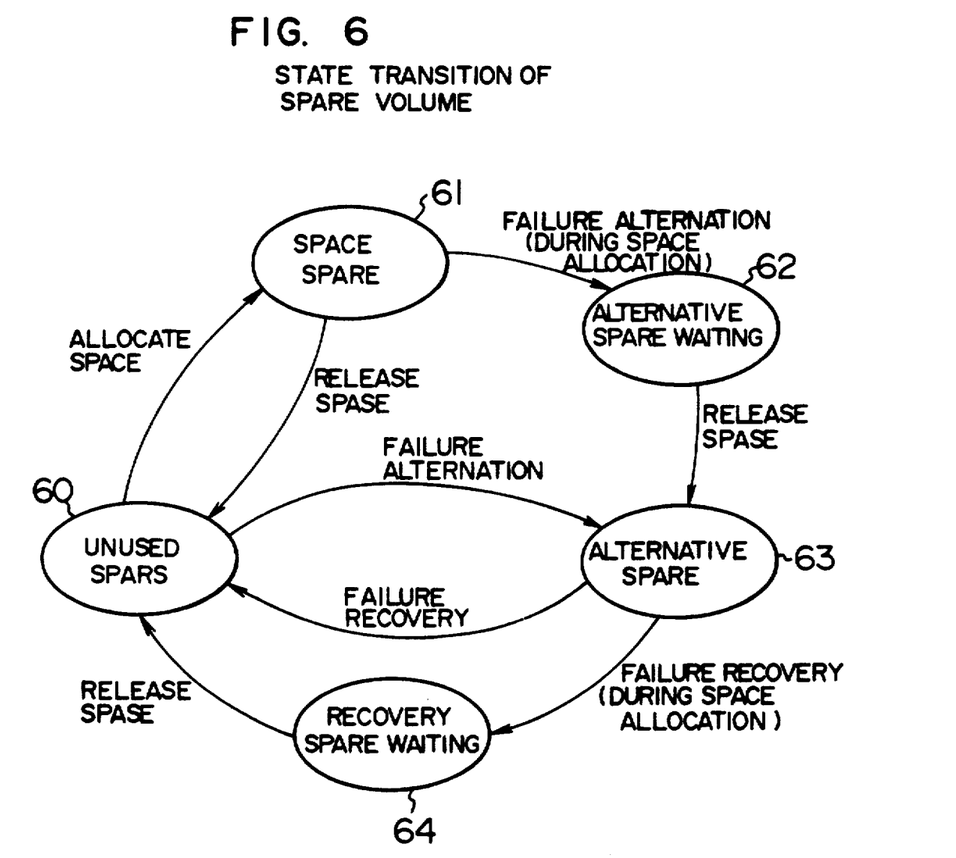
FIG. 6 is a chart showing state transition of a spare volume provided in the active pool of FIG. 1.

FIG. 6 shows changes in state of spare volumes 9x and 9y provided in the active pool 9.

Initial state of the spare volume is an unused spare space 60 which is used as a temporal space allocation volume where there is not enough free space in the active pool 9. If space allocation is performed to the unused spare space 60, the state of the unused spare space 60 is then changed to the state of the spare space 61. The space allocated to a spare volume is archived to the inactive pool 10 on completion of access and the space of the active pool 9 is released. If the entire space in the space volume is released, the state of the spare volume is returned to the state of the unused spare space 60 again.

If a hardware failure occurs in a volume of the active pool 9 on the other hand, the spare volume is used as an alternative volume for the affective volume for assuring a total space capacity in the active pool 9. If the state of the spare volume is the state of unused spare 60 when the failure occurs, the state is immediately changed to the alternative spare 63 so that the spare volume is used as an alternative of affective volume. If the state of the spare volume is the state of the space spare 61 when a failure occurs, release of the entire space in the spare volume is waited for. At a state of alternative spare waiting 62, a new space operates so that it is not allocated to the spare volume. The space which has already been allocated is moved to the inactive pool 10 on completion of access and is released from the spare volume. The state of the spare volume is changed to the state of the alternative space 63 on releasing of the entire space in the spare volume and the spare volume is used as an alternative of the affective volume. At the state of the alternative spare 63, space is allocated to the spare volume in a manner similar to the usual volume.

If space is not allocated in the spare volume on recovery of the failed volume, the volume at the state of the alternative spare 63 is then recovered to the state of the unused spare 60 again. If space is allocated in the affective volume, the volume is placed in the state of a recovery spare waiting 64 to wait for release of the entire space in the spare volume. At the state of recovery spare waiting 64, the new space operates so that it will not be allocated to the spare volume. The space which has already been allocated is moved to the recovery volume to be released from the spare volume on completion of access. The space is returned to the unused spare 60 again upon the release of the entire space in the spare volume.

As another feature of the present invention, the peripheral storage group, may be collected as storage pools depending on their performances and application objects. A plurality of storage pools are allowed to be used by users. Preliminarily registering selection criterion of a storage pool makes it possible to select storage pools which meet the selection criterion on allocation of space. This makes it possible to select an optimum storage pool so that spaces of the peripheral storage group can be efficiently used.

As the above mentioned space selection criterion, a maximum capacity of usable space in the storage pool unit is set for each user and the space used capacity of each user is measured in units of storage in the pool on allocation of space. Actual space used capacity of each user in each storage pool is compared with the maximum usable capacity of the storage pool to determine which storage pools are within the maximum usable capacity. If there are a plurality of storage pools within the maximum usable capacity, storage pools having an actual space usage amount are determined. This makes it possible to select the storage pools having less actual used capacity for averaging the space usage rate of the storage pools.

Furthermore, the space used capacity is measured in the storage pool unit on allocation of space to the above mentioned storage pool and the actual space used capacity to each storage pool is used as a space selection criterion so that a storage pool having the least actual space used capacity is selected. This makes it possible to select an optimum storage pool having a lowest actual space used capacity for efficiently using the spaces of the peripheral storage group. A device busy rate and the like are measured as an actual used capacity of the storage pool and are used as criterion of space selection so that a storage pool having a low device busy rate is determined. This makes it possible to select a storage pool having a low device busy rate so that load dispersion of the peripheral storage group can be efficiently realized.

As is apparent from the above description, in accordance with the embodiments of the present invention, the peripheral storage groups are grouped into storage pools according to their performances and application objects and the storage pools are divided into active pools for file allocation and inactive pools for file migration and are ranked as large capacity logical volumes. By specifying the space usage capacity including the active and inactive pools for each user who uses the storage pools space having a capacity exceeding the total space capacity of the active storage pool can be provided to the users. It is not necessary to set again the maximum storage capacities of the registered users corresponding to change in users who use the storage pool (increase or decrease in users and change in the maximum storage capacity of some users). Since the maximum storage capacity of space is preset by the space usage capacity including the active and inactive pools, an efficient utilization of space can be realized merely be adding volumes to the active pools even if a lot of file movements occur between the active and inactive pools.

The destination (active or inactive pools) to which the file is to be moved on completion of access is preliminarily clearly defined with respect to files which are less frequently used and the file is automatically moved from the active pool to the inactive pool on completion of access of the file so as to make space in the active pools in such a manner as to make it possible to efficiently use the space of the active pool for reducing the movement of files between the active pool and the inactive pool.

In accordance with the present invention spare volumes are disposed within the storage pool and the spare volumes in the storage pool are temporarily allocated when the free capacity in the storage pool is insufficient or when enough free capacity cannot be assured by the migration of files to the inactive pool. Furthermore, the spare volumes can be used as alternative volumes of the affective volume when a failure occurs in the volume in the active pool so that assurance of the total space capacity in the active pool can be realized until the faulty volume is recovered.

What is claimed is:

1. A method of managing space in a peripheral storage in a data processing system having a data processing device connected to said peripheral storage, said peripheral storage consisting of both an active pool having a plurality of storage volumes to which files are allocated and an inactive pool having another plurality of storage volumes to which files are migrated from said active pool, comprising the steps of:

issuing a space allocation request for a file in response to a command from a user;

determining in response to the space allocation request whether or not the size of a requested space to be allocated to said file exceeds a total usable space size which amounts to a sum of a the size of free space available in the active pool and the size of free space available in the inactive pool;

checking whether or not the size of the free space available in the active pool is enough to fulfill the request for space when a negative decision results in said determining step;

selecting volumes from the active pool to allocate to the requested space when a positive decision results in said checking step; and effecting a migration of a file in the active pool to move the migration file from the active pool to the inactive pool to produce a space in the active pool when the negative decision results in said checking step and then performing said selecting step again if the free space produced by the migration provides enough free space in the active pool to fulfill the request for space.

2. A method of managing space in a peripheral storage as defined in claim 1, wherein said determining step includes the steps of:

recording information indicating a current used capacity of said active pool;

comparing the total usage capacity of said active pool and inactive pool with the sum of said current used capacity of said active pool and the capacity of added space required by the space allocation request of the user; and indicating an allocation error in the allocation of space when said sum is determined to be larger than said total usage capacity as a result of said comparing step.

3. A method of managing space in a peripheral storage as defined in claim 1, wherein said active pool includes active storage volumes and spare storage volumes and further including the step of:

temporarily allocating a spare storage volume when a failure occurs in an active storage volume in said active pool.

4. A method of managing space in a peripheral storage as defined in claim 1, and further including the steps of:

setting an active reserved capacity as a limit for commencing migration of files from the active pool to the inactive pool when said active reserved capacity is exceeded by a current active used capacity;

comparing the current active used capacity with said active reserved capacity; and migrating a part of the files used by other users to said inactive pool when the current active used capacity is larger than the active reserved capacity as a result of said comparison step.

5. A method of managing space of a peripheral storage as defined in claim 4, and further including the steps of:

inputting an active assured capacity which is a limit for a minimum space for each user in said active pool;

comparing a current active used capacity by said other users with said active assured capacity; and migrating a part of the files which are being used by said other users to said inactive pool when the current active used capacity is larger than the active assured capacity as a result of said comparing step.

6. A method of managing space of a peripheral storage as defined in claim 5, in which said active reserved capacity is not less than said active assured capacity and in which comparison of said current usage capacity with said active reserved is performed prior to comparison of said current usage capacity with said active assured capacity.

7. A method of managing space according to claim 1, further including the steps of:

adding to said active pool a spare storage volume; and temporarily allocating said spare storage volume for a part of said active pool when there is not enough free space in said active pool.

8. A data processing system, comprising:

a data processing device;

a memory for storing a table;

a management catalog control unit connected to said memory for storing information in said table representing a total usage capacity of the usable space set by users in a peripheral storage including an active pool having a plurality of active storage volumes to which files are allocated and an inactive pool for holding files which are migrated from said active pool;

space allocating means connected to said peripheral storage for allocating space of files to users on the basis of said total usage capacity; and file allocating means connected to said peripheral storage for inputting information in said table indicating the current usage capacity of said peripheral storage depending upon the use of space of said active pool and form comparing the sum of added space requested by users and said current usage capacity with said total usage capacity to detect an error of allocation of said added space in said peripheral storage when said sum is larger than said total usage capacity.

9. A data processing system as defined in claim 8, and further including a spare storage volume in said active pool, and a spare volume management unit connected to said peripheral storage for temporarily allocating a file to said spare storage volume when a failure occurs in an active storage volume in said active pool.

10. A data processing system as defined in claim 9, and further including migration/archive/recall means connected to said peripheral storage unit for inputting into said table information representing an active reserved capacity as a limit for commencing migration of a file from the active pool to the inactive pool when said active reserved capacity is exceeded and for comparing the current active used capacity of spaced used by said other users with said active reserved capacity so as to migrate a part of files used by said other users to said inactive pool when the current active used capacity is larger than the active reserved capacity.

11. A data processing system as defined in claim 10, in which said migration/archive/recall means inputs into said table information representing the active assured capacity which is a unit for assuring for the users a minimum available space in said active pool, compares the current active used capacity by other users with said active assured capacity and migrates a part of the files used by said other users to said inactive pool when the current active used capacity is larger than the active assured capacity.

12. A data processing system as defined in claim 11 in which said active reserved capacity is not less than said active assured capacity and in which comparison of said current active used capacity with said active reserved capacity is performed prior to comparison of said current active used capacity with said active assured capacity.

13. A data processing system according to claim 8, further including a spare volume management unit connected with said active and inactive pools for assigning an additional storage volume to said active pool as a spare storage volume and for temporarily allocating said spare storage volume to a file when there is not enough space in said active pool.

14. In a data processing system comprising a data processing device and a group of peripheral storages for file allocation, a method of managing space in the groups of peripheral storage devices comprising the steps of:
grouping the peripheral storage devices into active pools for file allocation and inactive pools for file migration from said active pools as storage pools;
preliminarily setting for each of a plurality of users a total usage capacity including both the active and the inactive pools as a maximum capacity of usage of space for each user who uses the active pools; and
responding to an allocation request for files by determining whether a requested storage area exceeds the size of said total usage capacity.

15. A method of managing space in a peripheral storage device group as defined in claim 14, and further including the steps of:
setting a usage capacity of an active pool; and
moving the files between the active pool and an inactive pool when the total usage capacity exceeds the usage capacity of said active pool.

16. A method of managing space in a peripheral storage device group as defined in claim 14, and further including the steps of:
checking whether free space in said active pools is sufficient to fulfill a request for space when it is determined that the requested storage area exceeds the size of said total usage capacity; and
specifying the location of a file to be migrated and the destination of the movement of the file to the inactive pools.

17. A method of managing space in a peripheral storage device group as defined in claim 14, and further including the steps of:
providing spare storage volumes in the active pool; and
temporarily allocating said spare storage volumes in said active pool when the free space capacity in the active pool is insufficient or when enough free space capacity cannot be assured by the migration of files to the inactive pool.

18. A method of managing space of peripheral storage group as defined in claim 14 and further including the steps of:
providing spare storage volume in the active pool; and
using a spare storage volume as an alternative storage volume in place of a defective storage volume when a failure occurs in a storage volume in the active pool.

* * * * *